United States Patent [19]
Reil et al.

[11] Patent Number: 5,227,177
[45] Date of Patent: Jul. 13, 1993

[54] DEVICE FOR HEATING PLATELIKE PARTS

[75] Inventors: Wilhelm Reil, Bensheim; Ulrich Deutschbein, Muhltal; Gerd Knobloch, Griesheim; Udo Liebram, Pfungstadt, all of Fed. Rep. of Germany

[73] Assignee: Tetra Alfa Holdings S.A., Pully, Switzerland

[21] Appl. No.: 717,885

[22] Filed: Jun. 19, 1991

[30] Foreign Application Priority Data

Jun. 20, 1990 [DE] Fed. Rep. of Germany ....... 4019632

[51] Int. Cl.⁵ .............................................. B29C 45/73
[52] U.S. Cl. ................................ 425/388; 425/405.1; 425/407
[58] Field of Search ................... 425/387.1, 388, 405.1, 425/407

[56] References Cited

U.S. PATENT DOCUMENTS

| | | | |
|---|---|---|---|
| 3,353,217 | 11/1967 | Snyder | 425/405.1 |
| 4,397,804 | 8/1983 | Medwed | 435/387.1 |
| 4,607,826 | 8/1986 | Ron | 425/405.1 |
| 4,689,004 | 8/1987 | Kunkel | 425/387.1 |

FOREIGN PATENT DOCUMENTS

| | | |
|---|---|---|
| 081781 | 6/1983 | European Pat. Off. . |
| 268720 | 11/1986 | European Pat. Off. . |
| 1404471 | 10/1968 | Fed. Rep. of Germany . |
| 1604424 | 4/1970 | Fed. Rep. of Germany . |
| 1604460 | 4/1970 | Fed. Rep. of Germany . |
| 3435188 | 10/1986 | Fed. Rep. of Germany . |
| 3807164 | 3/1990 | Fed. Rep. of Germany . |
| 7624628 | 4/1976 | France . |
| 454433 | 6/1968 | Switzerland . |
| 8807921 | 10/1988 | World Int. Prop. O. . |

*Primary Examiner*—Tim Heitbrink
*Attorney, Agent, or Firm*—Killworth, Gottman, Hagan & Schaeff

[57] ABSTRACT

A device for heating plastic plates using contact heat and hot gases which are supplied to the plastic plate to be heated by carrier plates is provided. Therein, two carrier plates are movable relative to each other vertically with respect to their common contact surface. Gas distribution conduits also open in the contact surface. In order that the plastic plates which are to be heated can be removed properly from the carrier plates, so that damage to the heating device is avoided, each contact surface of both carrier plates is surrounded by a frame-like, closed outer edge without mouth openings for the gas distributions conduits.

19 Claims, 5 Drawing Sheets

DEVICE FOR HEATING PLATELIKE PARTS

BACKGROUND OF THE INVENTION

The invention relates to a device for heating platelike parts made of a deep-drawable plastic material using contact heat and hot gases which are supplied to the part to be heated by means of carrier plates, wherein two carrier plates are movable relative to each other at least vertically to a common contact surface and gas distribution conduits open in the contact surface.

With sintering operations and with this art in general, it is necessary to process platelike parts using a device of the kind mentioned hereinabove, in order to weld or also deep-draw platelike parts made of deep-drawable plastic material. The word "platelike" is used to denote workpieces which are flat or laminar, which are e.g. in the shape of plates, shells, bars, strips or sheets. These kinds of platelike parts made of deep-drawable plastic material are joined together, or are heated by the deep-drawing process. They are placed in contact with so-called carrier plates, so that the heat energy is transmitted from the carrier plates to the platelike workpieces through contact. The idea has also been harbored of applying, alternatingly or additionally, hot gases, preferably hot air, to the platelike workpiece to be heated, in order to improve or accelerate the heating up or warming process. After the heating process, the two oppositely disposed carrier plates which have a common contact surface when they travel together, are displaced relative to each other in such a way that the platelike parts or workpieces can be removed and conveyed to other processing stations.

However, tests have unfortunately revealed that the platelike workpieces to be heated remain stuck to the contact surface, which is flat, for example, of at least one—or two, in the case of particularly bad embodiments—carrier plates. With these tests, gas distribution conduits have now also been arranged in the carrier plates so that the conduits open into the contact surface through openings, with the effect that compressed air can be used in helping to loosen a platelike part. In spite of this feature, the heated platelike workpieces have not always been able to be properly removed from the contact surface of the carrier plate. It has unfortunately been shown, for example, that the injected air for the purpose of pulling off the platelike part or blank from the carrier plate softens at the place where removal has already been effected and then no longer promotes detachment at the other places where there is still strong adhesion between the softened platelike workpiece and the carrier plate.

The total air pressure is reduced at said leakage places so that gas distribution conduits are of no use.

Even if the contact surface of the carrier plate is coated with a plastic material, such as for example, Teflon ®, removal of the platelike workpiece is not successful in the desired way. It has even been shown in practice that the platelike softened workpiece clings to the layer of Teflon ® and is removed together therewith from the carrier plate by the use of compressed air without the platelike workpiece even being removed properly from the surface as a whole.

The aim of the invention is therefore to create a device of the kind mentioned in the introduction, wherein the platelike parts can be removed properly from the heating plates, so that damage to the heating device can be avoided, and so that the service life of the device can be increased.

SUMMARY OF THE INVENTION

This problem is solved according to the invention in that each of the contact surfaces of both carrier plates is surrounded by a frame-like closed outer edge without mouth openings for the gas distribution conduits. In describing these measures it is best to imagine the contact surface as being flat, although it is even possible for there to be a gas-tight closure when the contact surfaces of the two carrier plates are bent or curved so that they match each other in the same way. An embodiment such as this is encompassed by the present invention. However, in this description, it will be adequate to mention only the simpler design of a flat contact surface. To heat the platelike workpieces made of deep-drawable plastic material, the plastic plate is placed between two carrier plates which can be moved together and apart relative to each other, wherein according to the invention, not the entire contact surface, but at least one frame-shaped edge at the periphery of the carrier plate comes into contact with the plastics plate for the purpose of heating. This outer edge is designed without mouth openings for gas distribution conduits, so that a barrier to gases is formed by this outer edge which is closed in on itself like a loop, and which is disposed at the periphery of the contact surface and thus also at the periphery of the plastic plate. In the region inside the outer edge there are mouth openings for gas distribution conduits which are capable of breaking a barrier of the afore-mentioned kind. By way of the inventive measures it is ensured, however, that the plastic plate which is to be heated in the region of the closed outer edge is clamped between two carrier plates in such a way that the workpiece, i.e. the plastic plate, is tensioned like a diaphragm. The plastic plate can behave like a tympanum or diaphragm, so that when hot gases are introduced into the one carrier plate and gases are sucked out onto the oppositely disposed carrier plate, the plastic plate, i.e. the heated workpiece, can advantageously be removed properly from the one carrier plate and the contact surface thereof. When the plastic plate is attached by suction to the oppositely disposed carrier plate, it can even be held there. The disadvantageous drawbacks of the afore-described device whereby the heated plastic plate partly remains on the carrier plate and is not removed because of the resulting softened and sticky condition is avoided.

It is also expedient if according to the invention the contact surface has, in the region inside the outer edge, at least one recess which is shallow in relation to the thickness of the carrier plate. With a preferred embodiment, a plastic plate which is about 2 mm thick is heated by being clamped between two carrier plates. The carrier plates are heated and are preferably even acted upon by hot gases which issue from the mouth openings in the region inside the outer edge of the contact surface. These mouth openings are disposed in said region inside the outer edge which is somewhat set back from the surface of the outer edge. With the embodiment under consideration here of the plastic plate which is 2 mm in thickness, the shallow recess is only 0.5 mm in depth. This is slightly set back with respect to the contact surface in the region of the outer edge, so that this recess is very shallow in relation to the thickness of the carrier plate as a whole which may, for example, be 20 to 30 mm. In other words, the depth of the recess on the inner surface of the carrier plate in the region inside the outer edge is only between 1 and 10%, preferably between 2 and 5%, of the thickness of the carrier plate itself. A shallow recess of this kind is sufficient to significantly increase the effect of the diaphragm-like tensioning of the platelike workpiece, which is surprisingly advantageous in that when a carrier plate is blasted accordingly, the plastic plate, even if heated and softened, can be removed, without more ado, from the inside surface of the carrier plate, i.e. from the contact surfaces and also from the recess. This removal operation is the actual aim of the invention and the operation is also reliably ensured by the use of simple means.

It is also advantageous according to the invention if, in the region inside the outer edge, the carrier plate has at least one insert which is at least partly gas-permeable and which has a recess towards the free surface. In the preceding exposition, account has only been taken of the so-called inner surface of the carrier plate, i.e. the surface which is opposite the corresponding surface of the other carrier plate. By virtue of the gas-permeable insert according to the features mentioned latterly, this inner surface of each carrier plate is advantageously replaced by the region inside the outer edge of the contact surface. In other words, in the region inside the outer edge there is a tool which is inserted into the carrier plate, namely the insert which is at least partially gas-permeable. It is true that the free surface thereof could be designed in one piece with the outer edge, so that neither the flat contact surface nor continuous, one-piece contact surface of the known devices results. However, this is not the aim of the invention. According to the invention, the insert is instead provided with a recess, as described already hereinabove in connection with the carrier plate. The insert also has on the free upper surface thereof a shallow recess which can be the above stated size in depth. On the rear side, the insert is embedded in the carrier plate and has no free surfaces. The one surface which is at least slightly free is instead disposed on the side where the recess is provided, on the one hand, and which is disposed, on the other hand, in opposite relationship to the carrier plate. Use of a gas-permeable insert permits an improvement to the blowing away or detaching operation of the diaphragm-like tensioned, heated plastic plate when hot gases are directed appropriately from the carrier plate.

In theory, it would be sufficient if one or a plurality of mouth openings were to be provided in the free surface of the insert, because then the diaphragm-like plastic plate could be removed properly.

It is, however, particularly advantageous if the gas-permeable insert consists of porous sintered material. This results in the gases issuing uniformly from that insert in the region of its recess, so that the heated platelike workpiece is removed properly from the respective surface of the carrier plate or surface of the insert inserted therein.

In the art, sintering is the sticking together of powders to form solid bodies at temperatures which are between about ⅔ and ¾ of the absolute smelting temperature. Therein, the sintered material is not smelted, or only partial smelting is effected of mixing partners which may be present and which smelt to a small extent. Stabilisation during the sintering process is effected by viscous flows, rapor condensing and diffusion processes on the boundary surfaces of the granules.

Sintered metals are particularly suitable for the inserts according to the invention, that is to say metals and alloys (sintered alloys) which are obtained by sintering metal powders. Apart from sintered metals, it is also possible to produce fire-proof materials, oxide ceramics, ceramic substances etc. In any case, sintered materials are porous and are therefore particularly suitable for distributing gases which can be injected on one side by pressure. Heated gases can, for example, be injected through the gas distribution conduits through the mouth openings on the inner surface of the carrier plates and thence into the pores on the rear side of the insert. In the region of the afore-mentioned shallow recess, these heated gases then issue out at the free surface of the insert and thus cause the diaphragm-like plastic plate held between the carrier plates to be released in the desired way.

One particularly preferable embodiment of the invention is one where the contact surface of two oppositely disposed carrier plates is flat, where the respective inserts are designed like plates, and wherein the inner reverse surface of the carrier plate has mouth openings for the gas distribution conduits.

Therein, it is particularly favorable if, according to another advantageous embodiment of the invention, the contact surface of each elongate carrier plate has, in the region inside the outer edge, a row of parallel intermediate peripheral bars disposed at a distance from each other and forming a plurality of recesses between them. This feature enables an elongate plastic plate to be heated, in order, for example, to be able to deep-draw a plurality of containers in one piece from this one elongate plate.

Thought has been given to creating a device for deep-drawing shells which are open on one side from a blank made of deep-drawable plastic material, wherein a deep-drawing device such as this has both a deep-drawing tool and complementary jaws which are movable relative to each other in such a way that two of the afore-mentioned carrier plates are oppositely disposed for a period of time, in order for the heating process for the platelike workpiece to be carried out during that period of time. The device according to the invention can then be used to deep-draw shells which are to be stuck, sealed or joined to one another inseparably in some other way along their edges, for example. From one single plastic plate in the form of a workpiece, it is thus possible to shape a plurality of open bowls simultaneously, to join them together if necessary, and to close them. It is thus possible to simultaneously manufacture, fill and close a plurality of four, six, ten or more packs, for example.

Further advantages, features and possible applications of the present invention will emerge from the following description of a preferred embodiment, given in conjunction with the accompanying drawings, and the appended claims.

DETAILED DESCRIPTION OF THE PREFERRED EMBODIMENT

Figure 1:
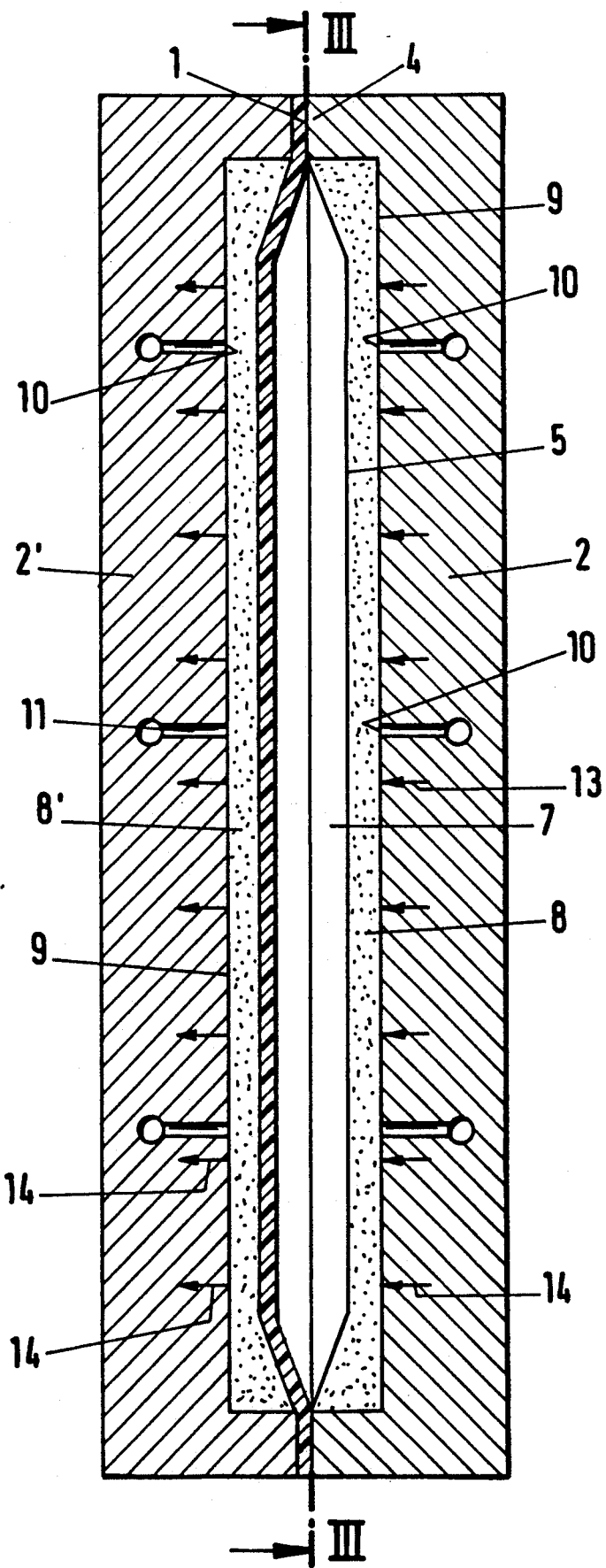
FIG. 1 shows the cross-sectional view through a pair of carrier plates which are in operation, one of which carrier plates is shown in perspective in FIG. 3, approximately along the broken line I-I.
Figure 2:
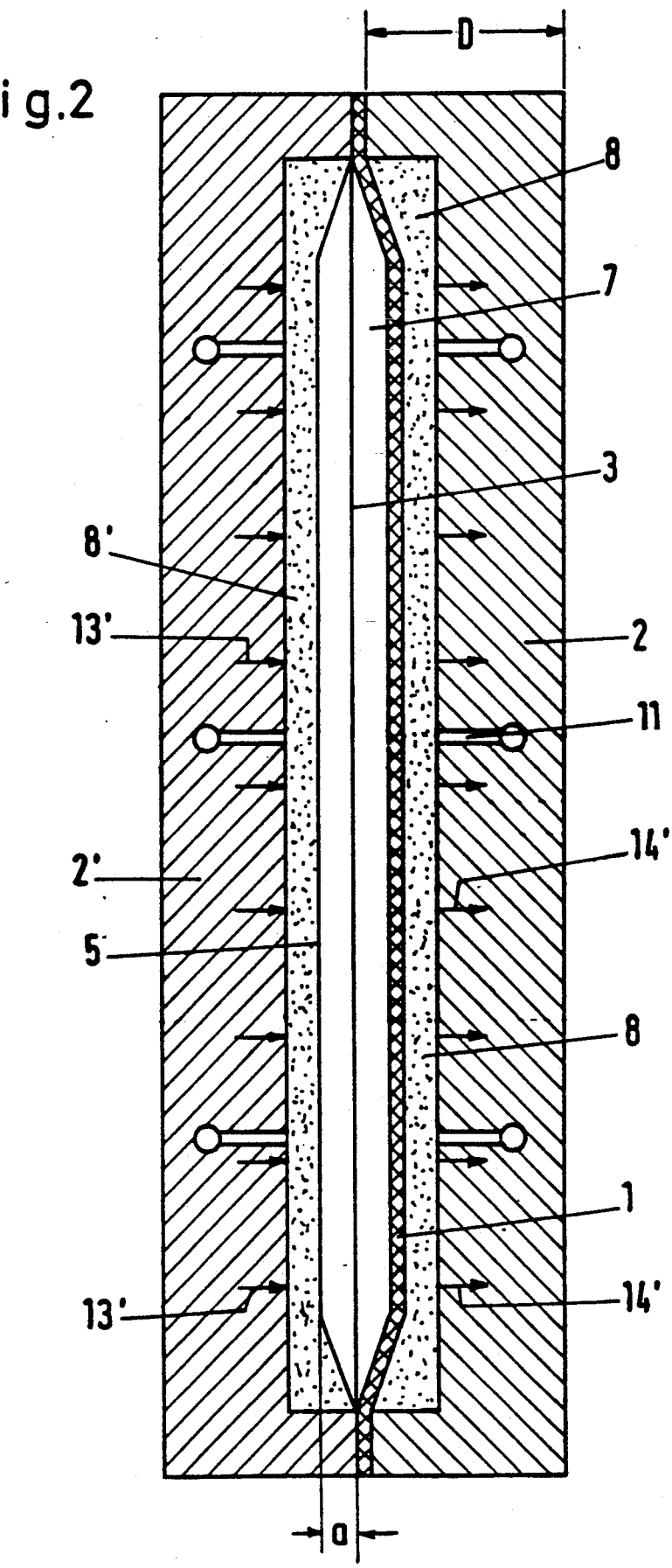
FIG. 2 shows a similar view to that in FIG. 1, wherein, however, the platelike part, the plastic workpiece plate, has been blown or sucked onto the oppositely disposed carrier plate.

It can be imagined that a rectangular, elongated plate of plastic material is to be heated as the workpiece, wherein this plastic plate which is only shown in cross-section (platelike part) 1 is shown in two different states in FIGS. 1 and 2.

The material of this platelike part 1 is a deep-drawable plastic material, from which a pack can be manufactured, for example. The material can be a thermoplastic material e.g., polypropylene. PVC, poly(vinylchloride), can also be used as the plastic material. A plate which is manufactured from a plastic material of this kind, or a shell which is deep-drawn from this plate, or a pack which is formed from one or two shells, then consist of parts and materials which can be reused properly and which decompose easily (in contrast to composite materials, such as for example paper coated with plastic material). With a particularly preferred embodiment, it is possible for the plastic material, e.g. the polypropylene to be filled, wherein chalks, mica, talc, gypsum or the like may be used as fillers. In practice, filling degrees of up to 70%, preferably 60%, have proved favorable. It has been shown that these kinds of filled plastic materials decompose very easily, on the one hand, without more ado, of course, and that they can be reworked or recycled using simple methods, and that, on the other hand, the properties of a plastic material are not adversely affected. These kinds of filled plastic materials are therefore most importantly deep-drawable and sealing.

Figure 3:
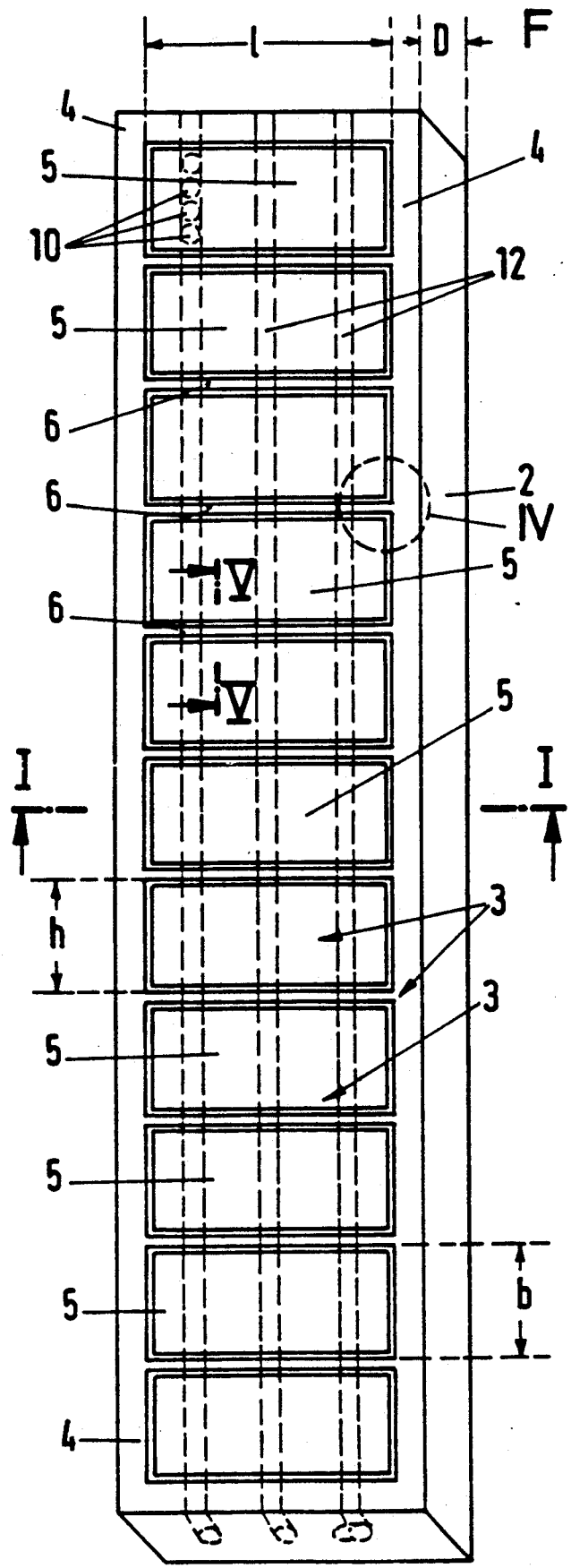
FIG. 3 shows a perspective view of a carrier plate with a row of 11 inserts arranged behind one another.
Figure 4:
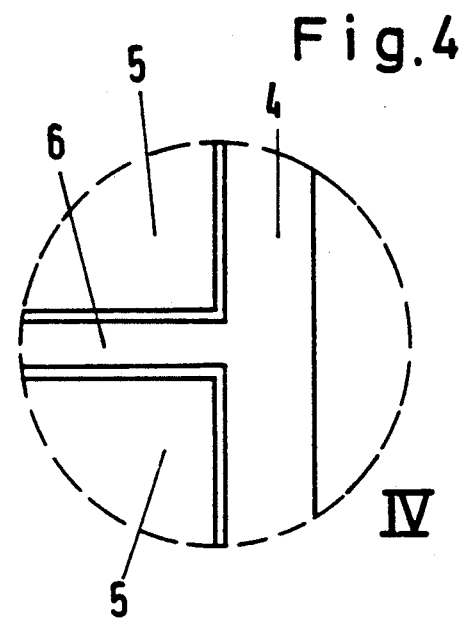
FIG. 4 shows a broken away view, on a large scale, of a unit on the curve IV in FIG. 3.

The carrier plate 2 shown in perspective in FIG. 3 is the right-hand part in FIGS. 1 and 2, while the oppositely disposed carrier plate is denoted in FIGS. 1 and 2 by the reference numerals 2'. In FIG. 3, a view is taken of the contact surface which is generally denoted by the reference numeral 3, and which contact surface is composed of the sum of three sections, namely a frame-like closed outer edge 4, the region 5 inside the outer edge 4 and the row of intermediate peripheral bars 6 arranged at a spacing b from one another and extending parallel to one another, which intermediate peripheral bars form a plurality of the afore-mentioned regions 5-according to the illustration in FIG. 3, eleven regions 5 along one outer edge 4 and ten intermediate peripheral bars 6.

Each carrier plate 2, 2' is designed as an elongated parallelepiped. If the two carrier plates 2, 2' are placed against each another as shown in FIGS. 1 and 2, then they make contact at the common contact surface 3, which, in the exaggerated illustration of FIGS. 1 and 2 appears only to coincide at the outer edge 4. Actually, it is also possible to add to the contact surface 3 the region 5 inside the outer edge 4, because this is only set back from the common central line and the contact surface 3 by the distance a (FIG. 2) of, e.g., 0.5 mm. The shallow recess with a depth a of about 0.5 mm can scarcely be seen by the naked eye, but this recess, denoted by the reference numeral 7, is very important. The recess 7 is disposed in front of the region 5 inside the outer edge 4.

Figure 5:
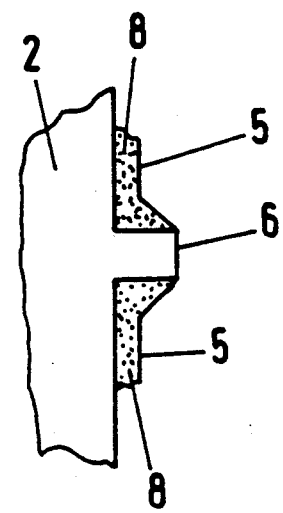
FIG. 5 shows, on a larger scale, and broken away, a unit along the line V—V in FIG. 3.

Each of the carrier plates 2 or 2' is provided on the inside thereof, i.e. on the side which is oppositely disposed to the carrier plate, with a recess, which can be manufactured by milling or the like, and which is partially filled by an insert 8 or 8'. The irregularly distributed dots in FIGS. 1, 2 and 5 indicate that the insert 8 is porous, a sintered metal, for example. The region 5 inside the outer edge 4 is formed in this embodiment by the surface of the insert 8, or the free surface of the insert 8 is equal to the region 5 inside the outer edge 4. Nonetheless, the material beneath the outer edge 4 is a metal, e.g. aluminium, from which the carrier plate 2 or 2' is formed, whilst the insert 8 is the afore-mentioned porous sintered metal.

The surface on the rear side of each insert 8, 8' coincides with the inner surface 9 of the carrier plate 2, 2'. Disposed on this surface there are mouth openings 10 which communicate with bores 12 for compressed air through gas distribution conduits 11. In this way, compressed air can come from the compressed air bores 12 via the gas distribution conduits 11, to the inner surface 9, e.g. the carrier plate 2, in order to be blown away in the direction of the arrow 13 through the porous insert 8 and over the region 5 inside the outer edge 4. In reverse, the same thing happens by means of the carrier plate 2' (FIG. 2) where the compressed air is then blown in the direction of the arrows 13'.

Accordingly, on the respectively oppositely disposed side, the carrier plate 2' can be responsible, as shown in FIG. 1, for suction in the direction of the arrows 14 or, in reverse, when in the condition shown in FIG. 2, for pressure in the direction of the arrows 14'.

Each recess 7 is shallow, i.e. its depth a is only e.g. 0.5 mm, and it is produced by milling or erosion in the insert 8, 8'. The recess 7 is shallow in relation to the thickness D of the carrier plate 2, 2', which can be between 20 and 50 mm, preferably between 25 and 40 mm in thickness, for example.

With the practical embodiment, on the contact surface 3 of the carrier plate 2 (FIG. 3) there are eleven inserts 8, each between 1 and 200 mm in length, and having a height h of 100 mm. The total length of the carrier plate 2 is thus greater than 1 m.

An appropriate plastic plate which is in the form of a platelike part 1 with the same dimensions as the entire contact surface 3 of the carrier plate 2 is adjusted and placed between two carrier plates 2, 2'. Three compressed air bores 12 pass through each carrier plate 2, wherein four gas distribution conduits 10, for example, leave each of these bores in each region 5 inside the outer edge 4 and the intermediate peripheral bars 6, so that the inner surface 9 of the carrier plate 2 and thus the rear surface of the insert 8 can be properly aired or ventilated (compressed air or vacuum).

The plastic plate inserted between the two carrier plates 2, 2' is a platelike piece which is to be heated, and it is first of all disposed somewhat along the common line 3 in FIG. 2, i.e. between the two contact surfaces. In order to arrive at the condition in FIG. 1, compressed air is now blown, from the right in the direction of the arrow 13 from the mouth openings 10 to the left into the inserts 8 and through these into the space of the recess 7. At the same time, hot air is sucked out in the direction of the arrow 14 onto the oppositely disposed side with the carrier plate 2'. The hot air introduced and the heated surface of the carrier plates heat the platelike part 1, which, in the exaggerated position shown in FIG. 1, rests on the surface in the region 5 of the insert 8'.

The two carrier plates 2, 2' can now be removed properly from each other, and by virtue of the air sucked in the direction of the arrows 14 in the left carrier plate 2' in FIG. 1, the platelike part 1 can be kept attached. For example, the carrier plate 2' could be moved vertically into another position, and then be positioned in opposite relationship to another carrier plate 2, in order to arrive at the state shown in FIG. 2.

If the intention is to bring the platelike part 1 which has been further heated into the condition shown in FIG. 2, then the currents of compressed air and of sucked air are diverted, while the platelike part 1 remains clamped like a diaphragm in the outer edge 4. On the left carrier plate 2', compressed air is blown in the direction of the arrows 13' behind the insert, whereby the diaphragm-like, clamped, platelike part 1 is immediately lifted, and comes to rest on the surface of the oppositely disposed insert 8 in the way shown in FIG. 2. This is also promoted by the air which is sucked off through the right-hand carrier plate 2 in the direction of the arrow 14'. It is to be understood that the left-hand carrier plate 2' can now be removed. While the platelike heated part 1 can be held by suction on the right-hand carrier plate 2.

Figure 6:
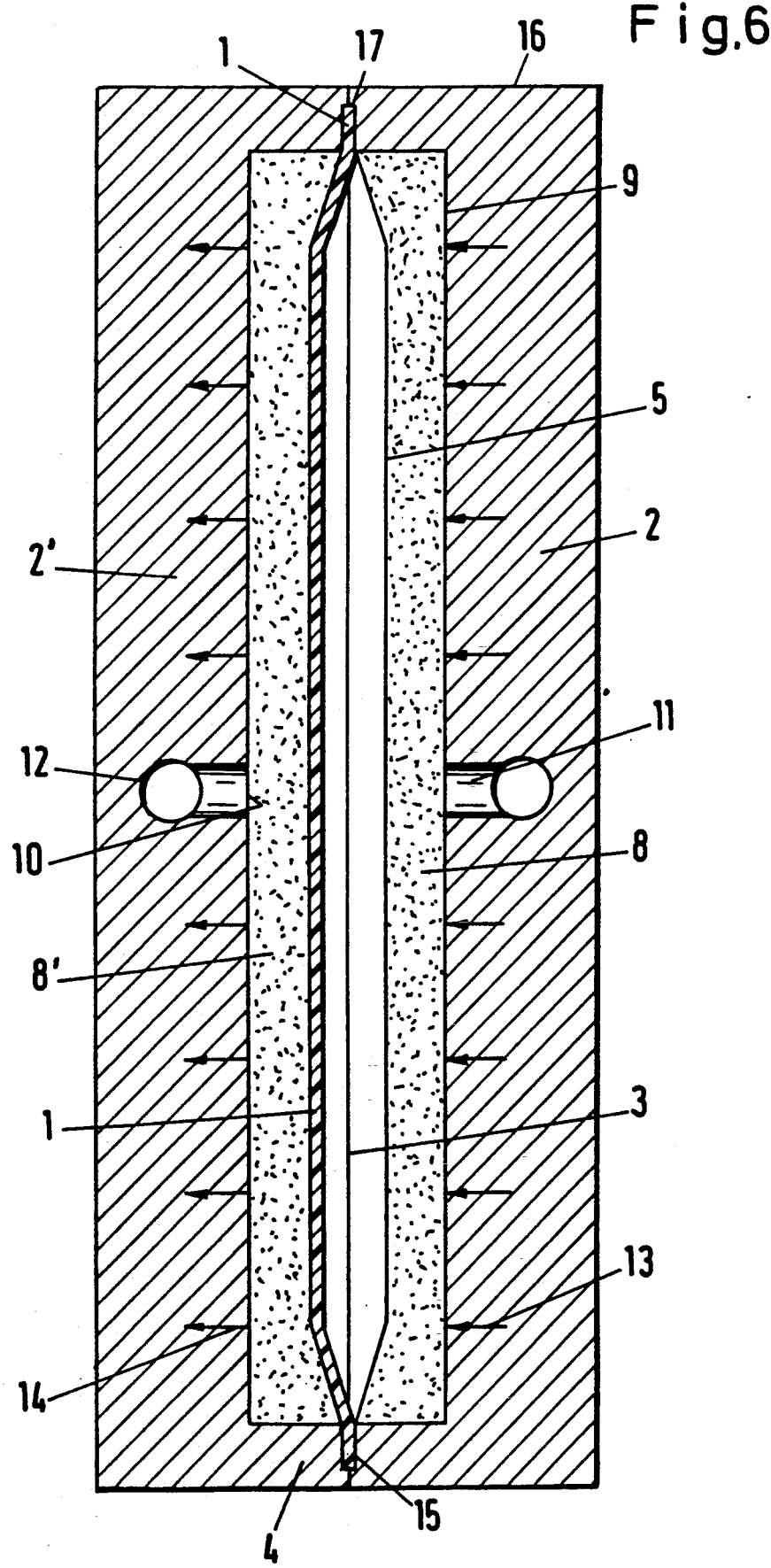
FIG. 6 shows a cross-sectional view through a pair of carrier plates which are in operation, similar to FIG. 1, however, of another preferred second embodiment, one of which carrier plates is shown in perspective in FIG. 7, approximately along the broken line VI—VI.
Figure 7:
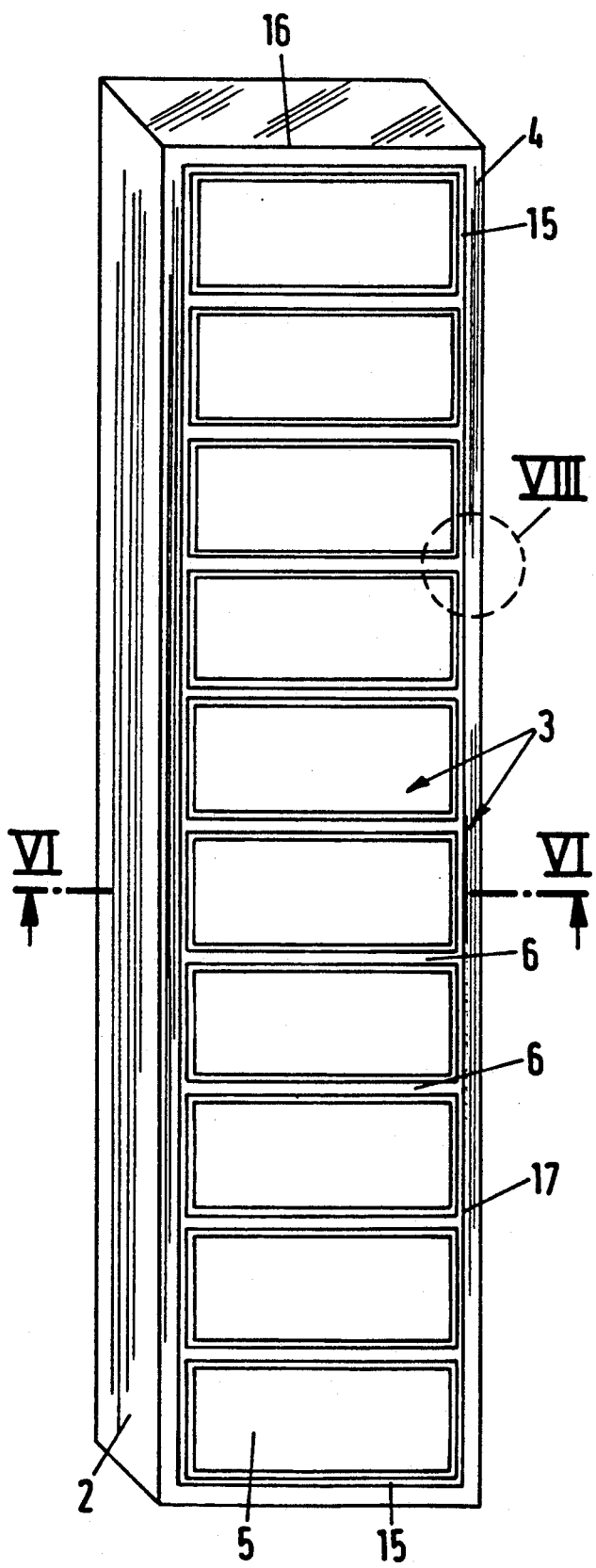
FIG. 7 shows a perspective view of a carrier plate with a row of eleven inserts arranged behind one another.
Figure 8:
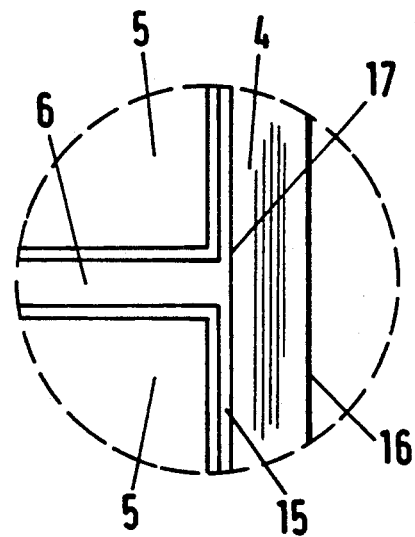
FIG. 8 shows a broken-away view, on a large scale, of a unit on the curve VIII in FIG. 7.

The preferred second embodiment is shown in FIGS. 6 to 8. Similar parts are provided thereby with similar reference numerals so that one can recognize the similarity of these two embodiments.

In FIG. 7 the carrier plate is not shown with compressed air bores and gas distribution conduits. However, one can imagine similar solutions as with the other embodiment according to FIG. 3, except the fact that in the second embodiment according to FIGS. 6 to 8, fewer gas distribution conduits 11 discharge in the inner surface 9 of the carrier plate 2 and 2', respectively.

So for example, FIG. 6 shows in each carrier plate 2 only one compressed air bore 12 approximately in the middle, from which bore some gas distribution conduits 11 extend laterally in the direction to the common contact surface 3 distributed over the length of the carrier plate, which gas distribution conduits 11 discharge with the mouth opening 10 thereof in the inner surface 9.

The largest and most important difference between the second embodiment according to FIGS. 6 to 8 in comparison to the first embodiment consists in a small recess 15 in the outer edge 4 of the carrier plate 2, 2' respectively. This recess 15 does not reach entirely to the outer edge 16 of the carrier plate but terminates in a distance ahead thereof in a step. This step is denominated 17 and appears as a line in FIGS. 7 and 8. Outside this line the two carrier plates 2, 2' contact each other as is shown for example in FIG. 6, without a work-piece laying in between; thus without a plate-like part 1 laying therebetween. The total outer edge 4 is surrounded outside by the line 16, and between the lines 16 and 17 the two tool parts are located, i.e. thus the two carrier plates 2 and 2' are laying on each other with pressure force. The depth of the frame-shaped recess 15 is chosen larger than half the thickness of the work-piece, thus the plate-like part 1. Consequently in the area of the recess 15 the plate-like part 1 is received and accommodated, respectively, without any pressure force, even when the two carrier plates 2, 2' are laying against one another and are pressed against each other with high pressure.

In distinction to the preceding embodiment in this preferred embodiment care is taken that the plate-like part 1 is not pressed by mechanical forces in the marginal area between the lines 16 and 17. The advance of this last described embodiment according to FIGS. 6 to 8 lies in that after heating, the plate-like part 1 will be removed and detached, respectively, in a reliable and exact manner from the respective carrier plate, even in the marginal area. Because the work-piece, plate-like part 1, expands somewhat if heated, the depth of the recess 15 is somewhat larger than half the thickness of the work-piece, i.e. the plate-like part 1. In the contacting or compressing condition of FIG. 6, the total height of both recesses 15 is by 1/10 mm up to 5/100 mm larger than the thickness of the plate-like part 1, i.e. thickness of the plastic material. Even during heating thus it is avoided in an advantageous manner, that the work-piece is not pressed by mechanical forces, although in the contacted or compressed condition of FIG. 6, the carrier plates 2, 2' substantially provide a sealing outside at the margin or edge.

Instead of the porous insert 8, the air or gas from the gas distribution conduits 11 can be applied to the plate-like part 1 by fine slots, too.

Having described the invention in detail and by reference to the preferred embodiments thereof, it will be apparent that modifications and variations are possible without departing from the scope of the invention defined in the appended claims.

What is claimed is:

1. A device for heating and transferring a substantially flat workpiece made of a deep drawable plastic material, said device comprising a pair of opposing carrier plates, each having a contact surface at least a portion of which contacts a workpiece positioned therebetween, wherein:

said carrier plates are movable relative to each other in at least a first direction to enclose and alternately contact opposite surfaces of said workpiece positioned therebetween; and said carrier plates include means for heating and transferring a workpiece from one to the other of said carrier plates while both said carrier plates and said workpiece are hot, said means for heating and transferring including:

at least one gas distribution conduit in each of said carrier plates for heating said contact surfaces; and at least one opening in each gas distribution conduit to alternately supply hot gas to and from the respective contact surfaces and to and from said surfaces of said workpiece; and wherein said gas distribution conduits are operable such that one said carrier plate supplies hot gas through the respective opening therein to one contact surface and one surface of said workpiece, as said opposing carrier plate conveys hot gas from the other contact surface and the opposite surface of said workpiece through the respective opening therein; and wherein said contact surfaces of said carrier plates each include an outer edge area without said at least one opening, for producing a substantially gas-tight, sealed periphery around a region of each said contact surface having said at least one opening by alternately contacting opposite surfaces of a workpiece; and wherein at least one of said contact surfaces includes a step extending around the periphery of said outer edge area beyond the periphery of said workpiece and towards the opposing carrier plate, to define a gap between said carrier plates wider than the thickness of said workpiece which is positioned therein, and to produce a substantially gas-tight, peripheral seal around said workpiece when said carrier plates are moved together;

whereby said means for heating and transferring enable said carrier plates to heat and transfer said workpiece, while hot, from one carrier plate to the other carrier plate.

2. A device as claimed in claim 1 in which the region inside said outer edge of said contact surface of at least one of said carrier plates includes at least one recess which is shallow in relation to the thickness of said carrier plate.

3. A device as claimed in claim 1 in which the region inside said outer edge of said contact surface of at least one of said carrier plates includes at least one insert which is at least partly gas permeable, and which includes a recess facing said opposing carrier plate.

4. A device as claimed in claim 3 in which said at least one insert comprises a porous sintered material through which air pressure and vacuum may equally be conveyed, such that said hot gas may be supplied to and conveyed from said contact surfaces and said opposing surfaces of said workpiece.

5. A device as claimed in claim 3 in which said at least one opening in each gas distribution conduit extends to said at least one insert, and said insert which is at least partly gas permeable conveys hot gas between said opening and said workpiece.

6. A device as claimed in claim 3 in which said recess of said at least one insert is substantially flat.

7. A device as claimed in claim 3 in which a portion of the surfaces of said carrier plates contacting said inserts include mouth openings connected to said openings in said gas distribution conduits.

8. A device as claimed in claim 1 in which said contact surfaces of at least one of said carrier plates include, in the region inside said outer edge, a row of substantially parallel intermediate peripheral bars spaced from each other and forming a plurality of recesses therebetween.

9. A device as claimed in claim 8 wherein said peripheral bars on said at least one carrier plate contacts at least a portion of a surface of a workpiece positioned therebetween comprise means for producing a row of intermediate, substantially gas-tight seals separating each of said recesses.

10. A device as claimed in claim 1 wherein said carrier plates are substantially identical in structure.

11. A device as claimed in claim 1 wherein said means for heating are operable to transfer a heated workpiece which remains substantially flat, and such transfer can occur from either of said carrier plates to the other.

12. A device as claimed in claim 5 wherein said inserts which are partly gas permeable provide a generally even gas pressure to and from said contact surface.

13. A device for heating and transferring a substantially flat workpiece made of a deep drawable plastic material, said device comprising a pair of opposing carrier plates each having a contact surface for contacting at least a portion of a workpiece positioned therebetween, wherein:

said carrier plates are movable relative to each other in at least a first direction for alternately contacting the opposite surfaces of said workpiece positioned therebetween; and said carrier plates include means for heating and transferring a workpiece from one carrier plate to the other carrier plate while both said carrier plates and said workpiece are hot, said means for heating and transferring including:

at least one gas distribution conduit in each of said carrier plates; and at least one opening in each gas distribution conduit to alternately supply hot gas to and from said respective contact surfaces and to and from said workpiece;

wherein each of said contact surfaces include an outer edge defining a substantially gas-tight peripheral sealing surface around a region of each of said contact surfaces, which region includes said at least one opening; and wherein said means for heating is operable to transfer a heated workpiece from one carrier plate to the other carrier plate by conveying hot gas to one said region and one surface of said workpiece while conveying hot gas from the other region and the other surface of said workpiece.

14. A device for heating and transferring a substantially flat workpiece made of a deep drawable plastic material comprising:

a pair of opposing carrier plates each having a contact surface for contacting at least a portion of a workpiece positioned therebetween, said carrier plates being movable relative to each other in at least a first direction for alternately contacting the opposite surfaces of a workpiece positioned therebetween; and means for heating and transferring said workpiece from one to the other of said carrier plates while both said carrier plates and said workpiece are hot, including means for alternately supplying hot gas to one of said contact surfaces and one surface of said workpiece, while conveying hot gas from the other of said contact surfaces and the opposite surface of said workpiece;

wherein each of said contact surfaces include an outer edge area defining a peripheral sealing surface around a region of each of said contact surfaces, which region includes said at least one opening, by alternately contacting opposite surfaces of a workpiece; and wherein at least one of said contact surfaces includes a step extending around the periphery of said respective outer edges beyond the periphery of said workpiece and towards the opposing carrier plate, to define a gap between said carrier plates wider than the thickness of said workpiece which is disposed therein, wherein said steps on said carrier plates are in opposing relationship to produce a substantially gas-tight, peripheral seal around said outer edge and around said workpiece when said carrier plates are moved together.

15. A device as claimed in claim 14 wherein when said carrier plates are moved together and said steps produce said peripheral seal, said steps separate said peripheral sealing surfaces of said outer edge areas, such that substantially no mechanical compressive force is applied to the surfaces of said workpiece.

16. A device as claimed in claim 14 in which the region inside said outer edge of said contact surface of at least one of said carrier plates includes at least one recess which is shallow in relation to the thickness of said carrier plate.

17. A device as claimed in claim 14 in which the region inside said outer edge of said contact surface of at least one of said carrier plates includes at least one insert which is at least partly gas permeable, and which includes a recess facing said opposing carrier plate.

18. A device as claimed in claim 14 wherein said peripheral sealing surfaces of said outer edge contact at least a portion of one of the surfaces of a workpiece to produce a substantially gas-tight seal.

19. A device as claimed in claim 14 wherein:
said contact surfaces of said carrier plates include, in said region inside said outer edge, a row of substantially parallel intermediate peripheral bars spaced from each other and forming a plurality of recesses therebetween; and
said peripheral bars of one carrier plate contact at least a portion of one of the surfaces of a workpiece to produce in contact with said one surface of the workpiece, a row of intermediate, substantially gas-tight seals separating each of said recesses.

* * * * *